Nov. 2, 1954 E. J. SHIRAK 2,693,340

ADJUSTABLE RATCHET WEBBING STRETCHER

Filed Jan. 9, 1953

INVENTOR.
Edward J. Shirak
BY
Gustav Miller
ATTORNEY

United States Patent Office 2,693,340
Patented Nov. 2, 1954

2,693,340

ADJUSTABLE RATCHET WEBBING STRETCHER

Edward J. Shirak, Hoboken, N. J.

Application January 9, 1953, Serial No. 330,443

6 Claims. (Cl. 254—51)

This invention relates to an adjustable ratchet webbing stretcher and has for an object to provide a webbing stretcher for use by an upholsterer in securing webbing on a seat frame which is adjustable for use on either a straight side of a seat frame, or on a curved or circular seat frame side member, which can be used to apply a desired and uniform strain on the webbing and retain it at the desired strain while it is being tacked, nailed, or stapled to the frame.

A further object of this invention is to provide a webbing stretcher which has a webbing stretching rotatable shaft whose angle relative to the seat frame may readily be adjusted due to an eccentric mounting means which may be eccentrically rotated to thus permit any desired angle of adjustment, and which is further provided with a mounting extension means for increasing the available adjustment when desired.

Still a further object of this invention is to provide a webbing stretcher having a rotatable toothed shaft to which the webbing may be secured and which may be rotated by either hand by means of a ratchet handle as much as necessary to provide the desired strain yet having the handle stop in a position where it will not interfere with ready operation of the other hand in securing the webbing on the seat frame.

With the foregoing and other objects in view, this invention comprises the combination, construction and arrangement of parts hereinafter set forth, claimed and disclosed in the accompanying drawings, wherein:

Figure 1:
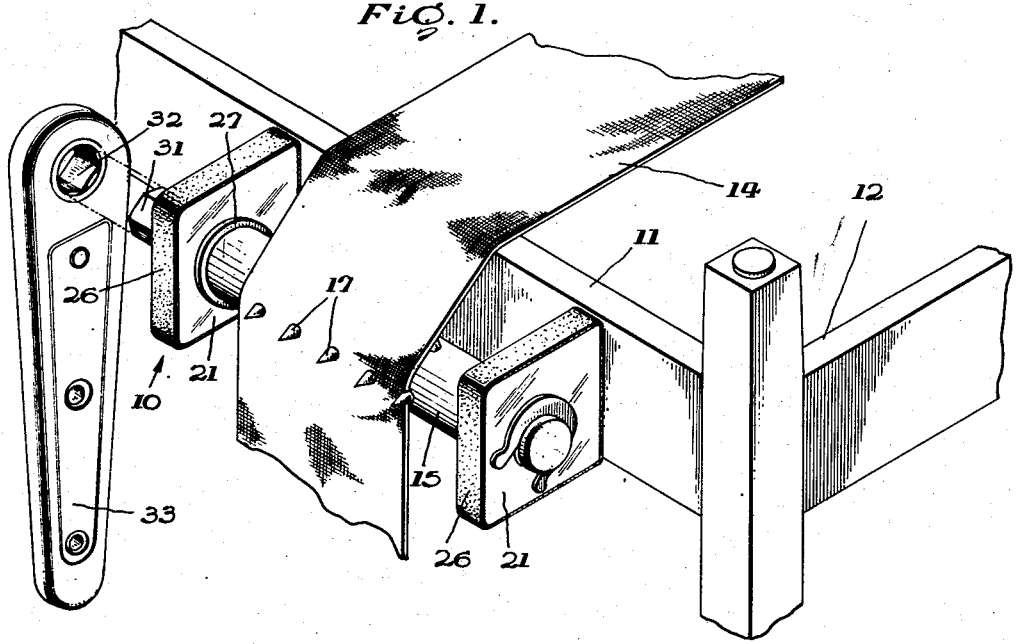
Fig. 1 is a perspective view of the invention as used on a straight seat frame portion.

There is shown at 10 the adjustable ratchet webbing stretcher of this invention as applied to the bottom of a straight side member 11 of a square seat frame 12 for stretching the webbing 14 to the proper tension and then holding it under strain in such stretched position while the webbing 14 is being nailed, tacked or stapled in the customary manner to the seat side member 11.

As will be seen, the stretcher 10 consists of a rotatable shaft proper 15 made of aluminum or other suitable metal and having a plurality of diametrically inserted doubled ended pins 16 thus providing a plurality of radially extending picks or teeth 17 which, in use, penetrate through the interstices between the woof and the warp of the yarn making up the webbing 14 to provide an easily removable grip on the webbing and stretch it as desired to the proper tension. A sufficient number of these pins 16 are provided so that an ample grip will be had on the webbing 14, it being noted, as shown, that the teeth 17 are located at least ninety degrees about the shaft 15.

Figure 3:
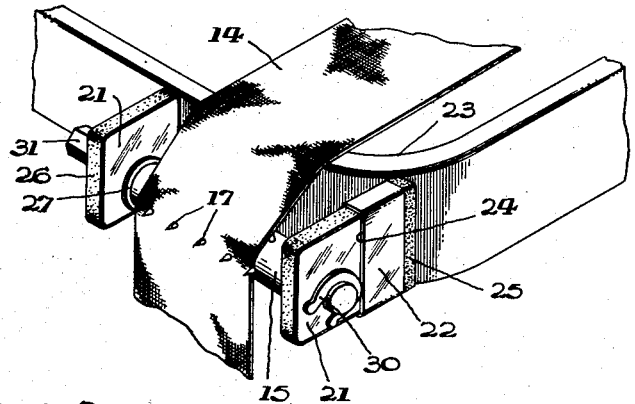
Fig. 3 is a perspective view showing the stretcher applied to a curved portion of a seat frame.
Figure 2:
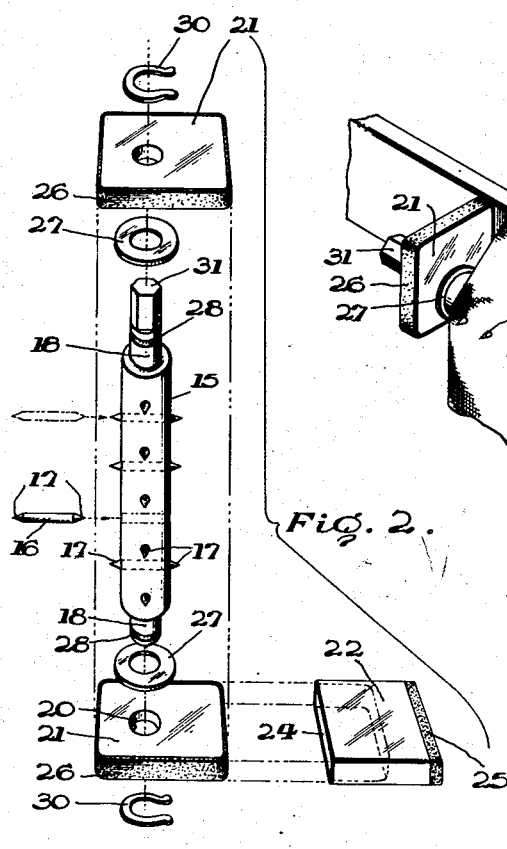
Fig. 2 is a perspective, exploded view of the webbing stretcher.

At each end of the shaft proper 15 there is provided reduced bearing ends 18, the bearing ends 18 being removably journaled through bearing openings 20 which are located eccentrically in polygonal or square shaped discs 21, made of any suitable material, such as metal similar to the shaft or otherwise, or any suitable plastic or rigid material having the requisite strength. As will be observed, particularly in Fig. 2, the bearing opening 20 in each disc 21 is eccentrically located in such a manner that the distance between the bearing opening and each side of the disc 21 is different than the distance between the bearing opening and every other side of the disc, both discs, however, being identical. Hence, when the discs 21 are placed symmetrically with relation to each other against the straight side member 11, the longitudinal axis of the shaft 15 is parallel to the side member 11, and if the discs are rotated symmetrically, the shaft will still be parallel to the side members, but by placing the discs non-symmetrically, as shown in Fig. 3, the angle of the shaft can be changed according to the relative placement of one disc to the other. Thus, both the distance of the shaft from the side member and its angle relative thereto can be adjusted as desired. Note also that the length of the shaft proper between the supporting bearing discs 21 is about twice the conventional width of the webbing 14, and hence, when used on a curved side member, as in Fig. 3, and placing the webbing 14 relative to the length of the shaft proper, any desired angle may be provided to insure that the webbing is stretched in the proper straight direction, irrespective of the curvature of the supporting side member.

In Fig. 3, there is shown an extension disc member 22 for extending the distance between a supported disc 21 and the supporting curved side member 23. This disc member 22 has a pocket 24 in one end of a size and shape to receive any side of disc 21, and on its opposite side, is provided with a cushioning friction member 25, such as semi-hard rubber or other plastic, for preventing marring of the seat side member 23 as well as preventing slippage during use.

Each disc 21 is also provided with a cushioning friction member 26, which may be in the form of a rubber band, or molded to the proper size and shape and suitably secured about the edges, as by being stretched thereover, or by cement or vulcanization, as desired.

Between the shaft proper 15 and the bearing ends 18, washers 27 may be provided to prevent wear and backlash on the discs 21. At the end of the bearing surfaces on the bearing ends 18, circumferential grooves 28 are provided to receive horseshoe shaped washers 30, of slightly resilient material, which act to hold the discs 21 rotatably on the journal bearing ends 18.

Projecting from one of the bearing ends 18 beyond the groove 28 is ratchet handle cooperating male member 31, hexagonal or polygonal in shape, for receiving the correspondingly shaped female ratchet member 32 of the operating handle 33. Obviously, the male and female members may be interchanged, but the form shown is preferred for the handle 33 with its female ratchet member is conventionally available as part of commercially sold wrench sets.

The operation will be obvious from the above description. The shaft proper 15 is adjusted as to the proper angle and distance from the supporting side member and may be placed for either right or left hand operation. The handle is operated to apply the proper strain or tension on the webbing 14, and then when at the proper tension, will be held in one hand while the webbing is stapled, nailed or otherwise permanently secured to the seat frame side member. By starting with the handle in the down position as shown in Fig. 1, and then ratcheting it up for one eighth to one quarter turn before rotating the shaft 15 in the tightening direction, one can be sure that it will be in a convenient holding position while securing the webbing to the seat frame side member.

While the device has been shown and the structure described in detail, it is obvious that this invention is not to be considered as being limited to the exact form disclosed, and that changes in detail and construction may be made therein within the scope of what is claimed, without departing from the spirit of this invention.

Having thus set forth and disclosed the nature of this invention, what is claimed is:

1. A webbing stretcher comprising a rotatable shaft having bearing ends of reduced size, a plurality of webbing engaging teeth extending from said shaft and means for adjustably journaling said shaft relative to a seat frame to which webbing is being applied comprising a pair of polygonal discs each having a bearing opening substantially eccentric to the center thereof through which said shaft bearing ends are journaled, said shaft bearing ends being of greater length than the thickness of said discs so as to project therebeyond, means cooperating with the projecting ends of said bearing ends for retaining said discs on said shaft bearing ends, and a handle rotating means on one end of said shaft, whereby different edges of said discs may be used as supporting edges against the seat frame to vary the angle of said shaft relative to the seat frame, and said shaft may be rotated to apply and then retain the desired strain on the webbing being secured to the seat frame.

2. A ratchet webbing stretcher comprising a rotatable shaft, having bearing ends of reduced size, a plurality of webbing engaging teeth extending from said shaft and means for adjustably journaling said shaft relative to a seat frame to which webbing is being applied comprising a pair of polygonal discs each having a bearing opening substantially eccentric to the center thereof through which said shaft bearing ends are journaled, said shaft bearing ends being of greater length than the thickness of said discs so as to project therebeyond, means cooperating with the projecting ends of said bearing ends for retaining said discs on said shaft bearing ends, and a ratchet handle rotating means on one end of said shaft, and means for increasing the eccentricity of the bearing opening of either of said discs comprising an extension disc member having a pocket in one edge thereof in which an edge of either of said polygonal discs may be received and supported, whereby different edges of said discs may be used as supporting edges against the seat frame to vary the angle of said shaft relative to the seat frame, and said shaft may be rotated to apply and then retain the desired strain on the webbing being secured to the seat frame.

3. A webbing stretcher comprising a rotatable shaft, having bearing ends of reduced size, a plurality of webbing engaging teeth extending from said shaft and means for adjustably journaling said shaft relative to a seat frame to which webbing is being applied comprising a pair of square discs each having a bearing opening substantially eccentric to the center thereof through which said shaft bearing ends are journaled, said shaft bearing ends being of greater length than the thickness of said discs so as to project therebeyond, means cooperating with the projecting ends of said bearing ends for retaining said discs on said shaft bearing ends comprising locking washers and cooperating circumferential grooves in said projecting bearing ends in which said washers lock to retain said discs on said shaft, a handle cooperating means on one end of said shaft comprising an extended male member on said shaft end and a female ratchet member in said handle, and a frame cushioning friction band mounted on the periphery of each of said discs, whereby different edges of said discs may be used as supporting edges against the seat frame to vary the angle of said shaft relative to the seat frame, and said shaft may be rotated to apply and then retain the desired strain on the webbing being secured to the seat frame.

4. A ratchet webbing stretcher comprising a rotatable shaft, having bearing ends of reduced size, a plurality of webbing engaging teeth extending radially from said shaft and means for adjustably journaling said shaft relative to a seat frame to which webbing is being applied comprising a pair of square discs each having a bearing opening substantially eccentric to the center thereof through which said shaft bearing ends are journaled, said shaft bearing ends being of greater length than the thickness of said discs so as to project therebeyond, means cooperating with the projecting ends of said bearing ends for retaining said discs on said shaft bearing ends comprising locking washers and cooperating circumferential grooves in said projecting bearing ends in which said washers lock to retain said discs on said shaft, a ratchet handle cooperating means on one end of said shaft comprising an extended male member on said shaft end and a female ratchet member in said handle, a frame cushioning friction band mounted on the periphery of each of said discs, means for increasing the eccentricity of the bearing opening of either of said discs comprising an extension disc member having a pocket in one edge thereof in which an edge of either of said discs may be received and supported, and a frame cushioning friction member mounted on the edge of said extension disc member opposite its pocket edge, whereby different edges of said discs may be used as supporting edges against the seat frame to vary the angle of said shaft relative to the seat frame, and said shaft may be rotated to apply and then retain the desired strain on the webbing being secured to the seat frame.

5. A ratchet webbing stretcher comprising a rotatable shaft, having bearing ends of reduced size, a plurality of webbing engaging teeth extending radially from said shaft and means for adjustably journaling said shaft relative to a seat frame to which webbing is being applied comprising a pair of square discs each having a bearing opening substantially eccentric to the center thereof through which said shaft bearing ends are journaled, said shaft bearing ends being of greater length than the thickness of said discs so as to project therebeyond, means cooperating with the projecting ends of said bearing ends for retaining said discs on said shaft bearing ends comprising horseshoe shaped locking washers and cooperating circumferential grooves in said projecting bearing ends in which said horseshoe washers lock to retain said discs on said shaft, a ratchet handle cooperating means on one end of said shaft comprising an extended male member on said shaft end and a female ratchet member in said handle, and a frame cushioning friction band mounted on the periphery of each of said discs, means for increasing the eccentricity of the bearing opening of either of said discs comprising an extension disc member having a pocket in one edge thereof in which an edge of either of said discs may be received and supported, and a frame cushioning friction member mounted on the edge of said extension disc member opposite its pocket edge, whereby different edges of said discs may be used as supporting edges against the seat frame to vary the angle of said shaft relative to the seat frame, and said shaft may be rotated to apply and then retain the desired strain on the webbing being secured to the seat frame.

6. A ratchet webbing stretcher comprising a rotatable shaft, having bearing ends of reduced size, a plurality of webbing engaging teeth extending radially from said shaft and means for adjustably journaling said shaft relative to a seat frame to which webbing is being applied comprising a pair of square discs each having a bearing opening substantially eccentric to the center thereof through which said shaft bearing ends are journaled, washer means fitting over said shaft bearing ends between the shaft proper and its journaling discs, said shaft bearing ends being of greater length than the thickness of said discs so as to project therebeyond, means cooperating with the projecting ends of said bearing ends for retaining said discs on said shaft bearing ends comprising horseshoe shaped locking washers and cooperating circumferential grooves in said projecting bearing ends in which said horseshoe washers lock to retain said discs on said shaft, a ratchet handle cooperating means on one end of said shaft comprising an extended male member on said shaft end and a female ratchet member in said handle, and a frame cushioning friction band mounted on the periphery of each of said discs, means for increasing the eccentricity of the bearing opening of either of said discs comprising an extension disc member having a pocket in one edge thereof in which an edge of either of said discs may be received and supported, and a frame cushioning friction member mounted on the edge of said extension disc member opposite its pocket edge, whereby different edges of said discs may be used as supporting edges against the seat frame to vary the angle of said shaft relative to the seat frame, and the ratchet handle on said shaft may be rotated to apply and then retain the desired strain on the webbing being secured to the seat frame.

References Cited in the file of this patent

UNITED STATES PATENTS

| Number | Name | Date |
|---|---|---|
| 562,015 | Morgan | June 16, 1896 |
| 1,854,037 | Johnson | Apr. 12, 1932 |
| 2,220,649 | Haskell | Nov. 5, 1940 |
| 2,327,143 | Stadtler | Aug. 17, 1943 |
| 2,416,708 | Moore | Mar. 4, 1947 |